No. 830,831. PATENTED SEPT. 11, 1906
H. GRONWALD.
PROCESS OF PRESERVING CORK.
APPLICATION FILED AUG. 10, 1905.
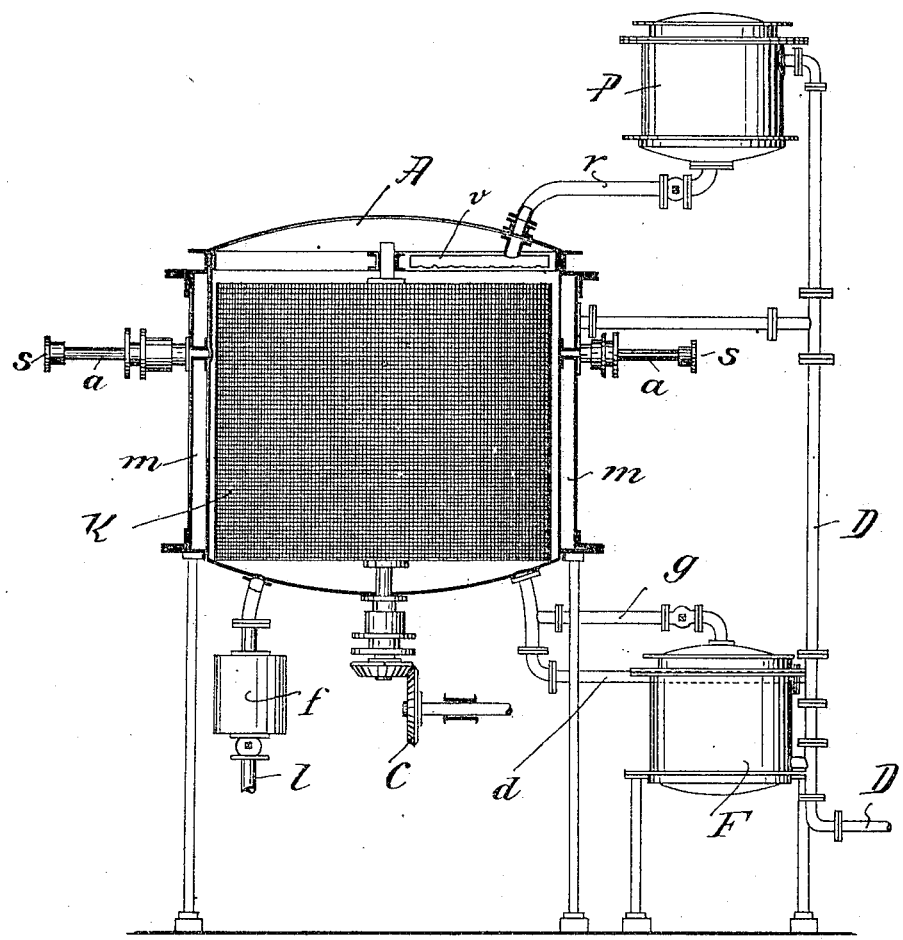
WITNESSES
Henry J. Suhrbier
Fannie Fish
INVENTOR
Hugo Gronwald
BY
his ATTORNEYS.

UNITED STATES PATENT OFFICE.

HUGO GRONWALD, OF BERLIN, GERMANY.

PROCESS OF PRESERVING CORK.

No. 830,831.  Specification of Letters Patent.  Patented Sept. 11, 1906.

Application filed August 10, 1905. Serial No. 273,645.

*To all whom it may concern:*

Be it known that I, HUGO GRONWALD, a citizen of the German Empire, and a resident of Berlin, German Empire, have invented certain new and useful Improvements in Processes for Preserving Cork, of which the following is a specification.

This invention relates to the preservation of cork, and has among its objects to provide a process for preserving cork in which a disinfecting-gas is thoroughly and rapidly forced into and removed from the pores of the cork, whereby the bacteria are completely destroyed and removed.

A further object of the invention is to provide a process for the purpose mentioned in which the cork while its pores are completely open and thoroughly clean is impregnated with a preservative substance, so that the pores are thoroughly filled therewith and the ingress of liquids and air into the body of the cork prevented.

With these and other ends in view the invention consists in the novel procedure to be hereinafter described and claimed.

In carrying out the process the apparatus shown in the accompanying drawing in elevation and part section is used.

In the chamber A, which is surrounded by a heating-jacket $m$, is provided a wire-gauze basket or drum K, which is adapted to be rotated by gearing C. The chamber A is also provided with pipes $g$ and $d$, which are connected with a formaldehyde-generator F and steam-main D, respectively. To this chamber is also secured a pipe $l$, provided with a filter $f$ for admitting air. At the side of the chamber A there are two openings $a$ to allow the escape of the displaced gases. The openings $a$ are adapted to be closed by screws $s$ or the like, and a cock is provided in each of the pipes mentioned for admitting air, steam, and the formaldehyde. In order to subsequently impregnate the corks with a substance, such as paraffin, ozokerite, &c., adapted to close the pores of the corks to air and liquids, a distributing-pipe $v$ is provided underneath the lid of the chamber A, said pipe being connected by a pipe $r$ with a vessel P, containing the liquid-impregnating substance or preservative.

The operation of the apparatus is as follows: After the corks have been heated in the apparatus to about 100° centigrade, so that their pores are open, the disinfecting-gas, such as formaldehyde, is admitted through the pipe $g$. At the same time the wire-gauze drum K is rotated by the gearing C. By this means the gas is driven through the corks. When the sterilizing operation is completed, the pipe $g$ is closed and pipe $l$ and openings $a$ opened. When the drum K is again rotated, fresh air which penetrates into the corks is drawn in through the filter $f$, displaces the gas contained in the same, and escapes through $a$. During this aerating process the corks are prevented from being entirely dried by now and again opening the cock in the pipe $d$ leading to the steam-main. As soon as the disinfecting-gases have been driven off the rotation of the drum K is stopped, the pipe $l$ and openings $a$ are closed, and the pipe $r$, leading to the vessel P, containing the impregnating substance, is opened, whereupon said substance passes through the pipe $v$ into the drum K, which latter is slowly rotated, so that the substance is distributed over all the corks, the pores of which are maintained in open condition by the heat. Thereafter the drum K is again quickly rotated in order to cause the impregnating substance to penetrate the pores of the corks and the excess to be driven off.

In addition to keeping the pores open in treating the corks with formaldehyde the temperature of 80° to 100° centigrade must be maintained during the whole operation for the further reason that the water-vapor developed with the formaldehyde from formalin would otherwise be condensed in the corks, and thus close the pores, or the formaldehyde would polymerize and be deposited in the corks.

In order to cause the disinfecting-gas to penetrate better and more quickly into the corks, the latter are caused to move in regard to the more inert gas while the gas is being introduced. For this purpose a centrifugal machine can be used with advantage. Such a movement is also necessary to completely expel the gas out of the corks by means of a sterile current of air and especially to carry out this operation quickly. In doing this the current of sterile air entering at the bottom of the apparatus is drawn in energetically and blown out through a pipe provided at the top of the apparatus. In order to prevent the natural humidity of the corks from being lost owing to the heat and centrifugal motion to which they are subjected, the disinfecting-chamber should be moistened by steam while the disinfecting-gases are being driven off.

This moistening operation may be effected intermittently.

Having thus described my invention, I claim as new and desire to secure by Letters Patent—

The process of preserving cork, which consists in subjecting the same to a dry heat, moving the cork through a disinfecting gas or vapor during such subjection to heat, then aerating the cork and simultaneously moistening the same, and finally impregnating such cork with a preservative.

In witness whereof I have hereunto signed my name, this 29th day of July, 1905, in the presence of two subscribing witnesses.

HUGO GRONWALD.

Witnesses:
HENRY HASPER,
WILLIAM MAYNER.